3,010,476
PUMP VALVE ASSEMBLY
Eugene R. Ziegler, Spencerport, N.Y., assignor to General Motors Corporation, Detroit, Mich., a corporation of Delaware
Filed Jan. 6, 1958, Ser. No. 707,171
2 Claims. (Cl. 137—512.4)

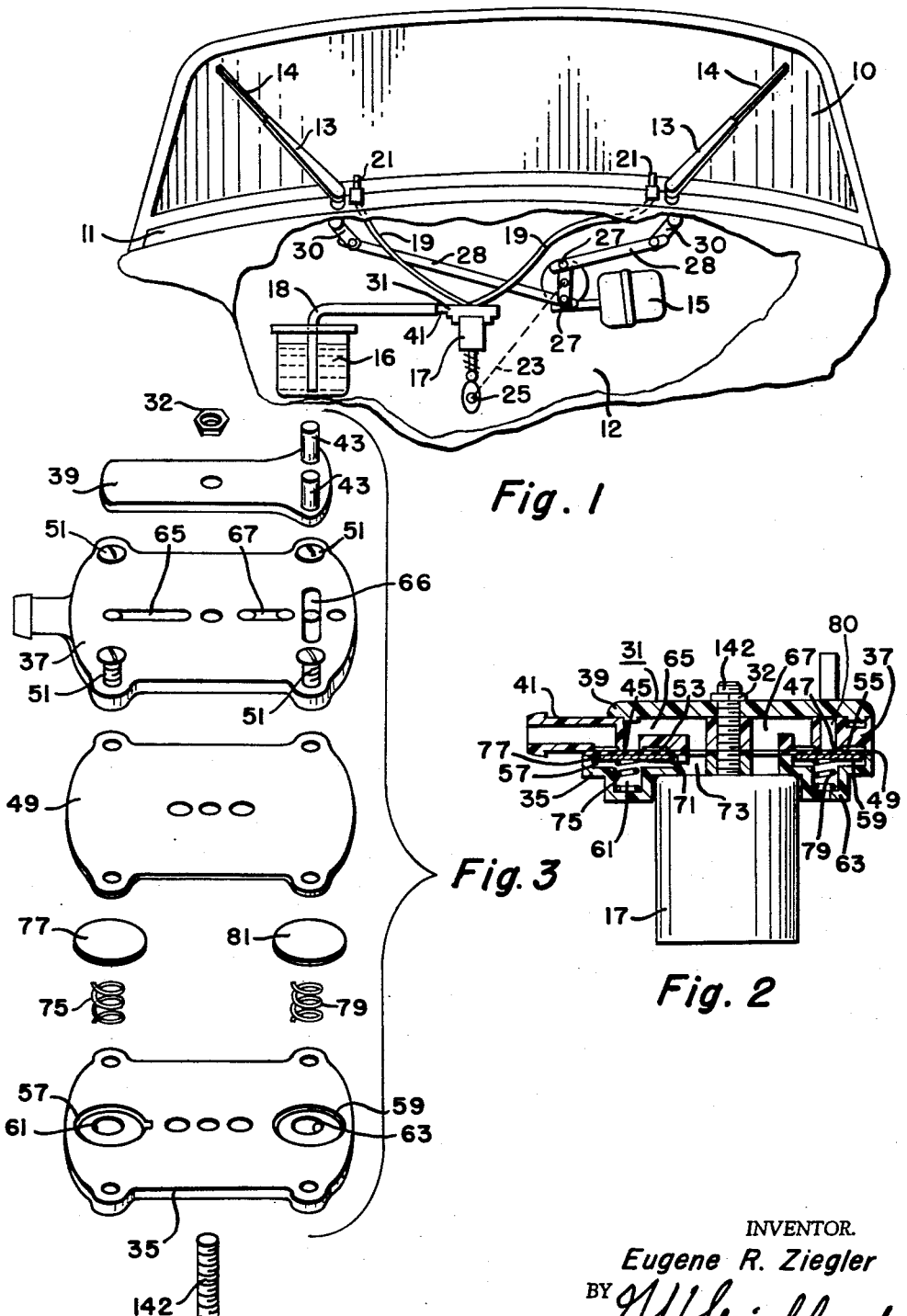

This invention relates to pumps and pump valves for pumping liquids having low surface tensions such as may be used for washing windshields.

When pumps are used for pumping liquids having low surface tensions, there is always difficulty in providing valves which are efficient for pumping purposes and yet will seal during the idle period.

It is an object of this invention to provide an efficient, economical, free-flowing valve construction for a pump which will seal sufficiently during the idle period to keep the pump primed even though low surface tension liquids are being pumped.

It is another object of this invention to provide an efficient, economical valve construction for a pump which can be easily molded.

These and other objects are attained in the form shown in the drawings in which the pump is provided with a valve head formed of two principal housing members between which is clamped a thin diaphragm of elastomeric material. The one housing member is formed into two parts which are bonded together to make possible the easy molding of the passages and chambers therein. The housing members are provided with inlet and outlet valve seats abutting the adjacent face of the diaphragm surrounding which are diaphragm chambers connecting with the suction inlet and the expansible chamber of the pump. Chambers are also provided in the valve housing directly opposite the valve seats, the one opposite the inlet seat being connected to the expansible chamber of the pump to permit easy opening of the inlet valve while the one opposite the discharge valve seat is vented to the atmosphere to allow easy discharge from the pump. Spring means assist in keeping the diaphragm sealed to the valve seats during the idle period to prevent leakage and to keep the pump primed.

Further objects and advantages of the present invention will be apparent from the following description, reference being had to the accompanying drawings, wherein a preferred form of the present invention is clearly shown.

In the drawings:

FIGURE 1 is a fragmentary view in elevation, with certain parts broken away, of an automobile having a windshield cleaning system embodying one form of pump and pump valves of this invention;

FIGURE 2 is a view in elevation of the pump showing the valve head in section, embodying one form of this invention; and FIGURE 3 is an exploded perspective view of the valve head shown in FIGURE 2.

Referring now to FIGURE 1, the automobile is shown as having a windshield 10, a cowl 11 and a fire wall 12. It is equipped with a pair of windshield wipers including the arms 13 and the blades 14 operated by the wiper motor 15 through a worm and worm wheel and the crank pins 27 connected by the links 28 with the cranks 30 connecting with the wiper arms 13. The wiper motor 15 as well as the reservoir 16 for windshield cleaning solution are mounted on the fire wall 12. Through a shaft extension 23 the motor 15 drives a two-lobed cam 25. The two-lobe cam 25 operates the expansible chamber of the pump 17.

The pump 17 is provided with a valve head 31 having an inlet 41 connected by the suction conduit 18 to the bottom of the reservoir 16. The valve head 31 also has dual discharge outlet tubes 43 connected to the discharge conduits 19 extending to the pair of nozzles 21 located in the cowl 11 for discharging the cleaning solution onto the windshield in the path of the wiper blades 14.

The windshield cleaning solution is preferably an aqueous solution which contains one or more solvents and/or detergents as well as an anti-freeze material. The presence of the solvents, detergents and anti-freeze in the aqueous solution causes its surface tension to be very low. This makes it possible for the solution to easily leak through ordinary pump valves during the idle period of the pump so that the pump loses its prime. The solution leaks from the conduits 19 back through the valves in the valve head 31 and the conduit 18 back into the reservoir 16 so that the conduits 19 are emptied and the pump 17 loses its prime. Under such circumstances, whenever it is desired to clean the windshields, there may be a complete failure to deliver the cleaning solution to the windshield 10 or there may be an undesirably long delay.

According to this invention, the valve head 31 is provided with free-flowing valves which permit the efficient pumping of the solution from the reservoir 16 to the nozzles 21 and yet the valves remain tightly closed when the pump is idle to keep the pump primed and to keep the conduits 19 filled with the cleaning solution. This makes possible the substantially instantaneous delivery of the cleaning solution whenever the pump 17 is started.

The valve head, or housing, 31 is fastened to the pump 17 by a nut 32 which is threaded onto a bolt 142 extending from the pump cylinder in a manner similar to that shown for the pump shown in FIGURE 14 of the copending application of Schmitz, Turner and Ziegler, S.N. 674,495, filed July 26, 1957. The valve housing 31 includes a lower member 35 and an upper member which is made of the parts 37 and 39. The member 37 includes a tubular inlet portion 41 connecting to the hose 18. The member 39 includes two discharge tubes 43 connecting with the discharge hose connections 19 extending to the nozzles 21. The member 37 is provided with an annular inlet valve seat 45 and an outlet annular valve seat 47 on its lower face which normally abut the adjacent surface of a thin diaphragm 49 of elastomeric material which is clamped between the valve housing members 35 and 37 by the nut 32 and four screws 51 extending through the four ears provided on the housing members 35 and 37. The diaphragm 49 not only serves as a valve member but it also serves as a resilient gasket to seal the upper and lower housing members 37 and 35 together. This diaphragm may be made of natural or synthetic rubber or an elastomeric plastic.

The housing member 37 is provided with annular diaphragm chambers 53 and 55 surrounding the valve seats 45 and 47. On the opposite side of the diaphragm 49 the housing member 35 is provided with diaphragm chambers 57 and 59 containing the spring retaining recesses 61 and 63. The tube 41 connects to the diaphragm chamber 53 while the tubes 43 connect to a transverse passage 66 in the housing member 37 connecting with the passage 80 leading to the annular discharge seat 47. The housing 37 is also provided with a horizontal passage 65 connecting the interior of the valve seat 45 with the interior of the expansible chamber of the pump 17. The expansible chamber of the pump 17 is also connected by a horizontal passage 67 in the housing member 37 extending to the diaphragm chamber 55. Both of these passages 65 and 67 have downwardly extending extensions through the diaphragm 49 and the lower housing member 35 communicating with the interior of the expansible chamber of the pump 17.

The housing 35 also has a direct connection 71 between the diaphragm chamber 57 and the enlarged extension 73 of the passage 65 leading to the expansible chamber. This may be formed merely by enlarging this portion 73 until it breaks through and removes a portion of the intervening wall to provide direct communication. Portions 71 and 73 constitute passage means interconnecting opposite sides of the diaphragm 49 in the area of the inlet valve seat 45. A light compression type coil spring 75 is provided in the recess 61 bearing against a thin, substantially rigid disc 77 of suitable metal or plastic for normally holding the portion of the diaphragm within the chamber 57 against the seat 45 with sufficient tightness to prevent leakage.

The balance of forces on this portion of the diaphragm 49 is such that when the expansible chamber of the pump 17 is enlarged, the diaphragm chamber 57 will be at suction pressure, while the diaphragm chamber 53 will be at the pressure of the reservoir 16 which is substantially atmospheric. This provides a sufficient pressure differential to move the diaphragm 49 far enough away from the seat 45 to allow free flow of the cleansing liquid into the expansible chamber of the pump 17. During the compression stroke, the chamber 57 will be under compression pressure which will hold the diaphragm 49 tightly against the seat 45. The spring 75 provides sufficient force during the idle period of the pump to keep the diaphragm 49 sealed to the seat 45.

A light coil spring 79 of the compression type is provided in the spring recess 63 which urges a thin disc 81 of suitable metal or plastic against the portion of the diaphragm 49 in the diaphragm chamber 59 to hold the diaphragm 49 in sealing engagement with the seat 47 during suction and idle periods of the pump 17. The bottom of the spring recess 63 is vented to the atmosphere so that during any compression stroke of the pump 17 the liquid will be forced through the passage 67 into the chamber 55 to depress and move the diaphragm away from the valve seat 47 to allow the liquid to flow through the passage 65 and the tube portions 43 and the housing connections 19 to the nozzles 21. The housing member 39 extends over and closes the top part of the passages 65, 66, 67 so that the housing 37 may be readily molded in a simple two-or-three part mold. The housing member 39 is preferably bonded to the housing member 37 by cementing or soldering.

This arrangement makes an efficient, economical valve head construction which will keep the valves tightly closed during the idle periods of the pump and allow free flow of the liquid during its operation.

While the form of embodiment of the invention as herein disclosed constitutes a preferred form, it is to be understood that other forms might be adopted, as may come within the scope of the claims which follow.

What is claimed is as follows:

1. Valve mechanism including, a valve housing comprising interconnected first and second members, a diaphragm of elastomeric material clamped between said members, said first member having spaced inlet and outlet valve seats and annular inlet and outlet chambers surrounding said inlet and outlet valve seats, the second member having spring chambers aligned with the inlet and outlet valve seats, spring means disposed in said spring chambers for urging spaced portions of said diaphragm against said inlet and outlet valve seats, first passage means connecting the inlet valve seat and extending through said first member, said diaphragm and at least a portion of said second member, and second passage means connecting the annular outlet chamber and extending through said valve, said diaphragm and at least a portion of said second member, said valve housing having an inlet tube connected with the annular inlet chamber and an outlet tube connected with the outlet valve seat.

2. Valve mechanism including, a valve housing comprising interconnected first and second members, a diaphragm of elastomeric material clamped between said members, said first member having spaced inlet and outlet valve seats and inlet and outlet annular chambers surrounding said inlet and outlet valve seats, the second member having spring chambers aligned with the inlet and outlet valve seats, spring means disposed in said spring chambers for urging spaced portions of said diaphragm against said inlet and outlet valve seats, first passage means connecting the inlet valve seat and extending through said first member, said diaphragm and at least a portion of said second member, second passage means connecting the annular outlet chamber, and extending through said first member, said diaphragm and at least a portion of said second member, and a passage in said second member interconnecting said first passage means and the inlet valve spring chamber, said valve housing having an inlet tube connected with the inlet annular chamber and an outlet tube connected with the outlet valve seat.

References Cited in the file of this patent

UNITED STATES PATENTS

| | | |
|---|---|---|
| 1,986,831 | Le Valley | Jan. 8, 1935 |
| 2,006,319 | Hueber | June 25, 1935 |
| 2,366,144 | Griswold | Dec. 26, 1944 |
| 2,529,028 | Landon | Nov. 7, 1950 |
| 2,686,533 | Gratzmuller | Aug. 17, 1954 |
| 2,809,589 | Randolph | Oct. 15, 1957 |
| 2,832,373 | Scholer | Apr. 29, 1958 |